United States Patent [19]

Taylor

[11] Patent Number: 5,482,431
[45] Date of Patent: Jan. 9, 1996

[54] ARRANGEMENT FOR SUPPLYING COOLING AIR TO A TURBINE CASING OF AN AIRCRAFT GAS TURBINE

[75] Inventor: Michael C. Taylor, Chellaston, Great Britain

[73] Assignee: Bayerische Motoren Werke AG, Munich, Germany

[21] Appl. No.: 284,476

[22] PCT Filed: Feb. 3, 1993

[86] PCT No.: PCT/EP93/00238

§ 371 Date: Aug. 4, 1994

§ 102(e) Date: Aug. 4, 1994

[87] PCT Pub. No.: WO93/15307

PCT Pub. Date: Aug. 5, 1993

[30] Foreign Application Priority Data

Feb. 4, 1992 [DE] Germany ............ 92 02 345.6

[51] Int. Cl.⁶ .................................. F01D 25/12
[52] U.S. Cl. ............ 415/111; 415/116; 60/39.83
[58] Field of Search ................ 415/111, 115, 415/116, 142, 144, 175, 176; 60/39.07, 39.83

[56] References Cited

U.S. PATENT DOCUMENTS

| 2,584,899 | 2/1952 | McLeod | 415/115 |
|---|---|---|---|
| 3,527,053 | 9/1970 | Horn | 415/116 |
| 3,527,054 | 9/1970 | Hemsworth | 415/111 |
| 4,034,558 | 7/1977 | Korta et al. | |
| 4,079,587 | 3/1978 | Nordström et al. | |
| 4,109,864 | 8/1978 | Clayton | |
| 4,156,342 | 5/1979 | Korta et al. | 60/39.83 |
| 4,369,016 | 1/1983 | Dennison | |
| 4,542,623 | 9/1985 | Hovan et al. | |
| 4,645,415 | 2/1987 | Hovan et al. | |
| 4,709,545 | 12/1987 | Stevens et al. | |
| 5,134,844 | 8/1992 | Lee et al. | 415/116 |

FOREIGN PATENT DOCUMENTS

| 2113429 | 9/1972 | Germany . |
|---|---|---|
| 2089439 | 6/1982 | United Kingdom . |

Primary Examiner—Edward K. Look
Assistant Examiner—James A. Larson
Attorney, Agent, or Firm—Evenson, McKeown, Edwards & Lenahan

[57] ABSTRACT

The wall space and the mounting space for turbine bearings in the casing of an aircraft gas turbine are each supplied with cooling air via a separate pipe, a first cooling-air pipe opening into the wall space and a second cooling-air pipe extending through the wall space and opening in the mounting space. To ensure that the respective space continues to be supplied with cooling air even if one of the two pipes breaks, the cooling-air pipe extending through the wall space and opening into the mounting space has air overflow openings in the region of the wall space.

5 Claims, 2 Drawing Sheets

ARRANGEMENT FOR SUPPLYING COOLING AIR TO A TURBINE CASING OF AN AIRCRAFT GAS TURBINE

BACKGROUND AND SUMMARY OF THE INVENTION

The invention relates to an arrangement for supplying cooling air to a turbine casing, especially that of an aircraft gas turbine, and comprising at least two cooling-air pipes or ducts branching off from a compressor stage, one pipe opening into the wall space of the turbine casing and the other pipe extending through the wall space and opening into a mounting space for the turbine bearings.

An arrangement for supplying cooling air to a turbine casing and comprising a single cooling-air pipe is shown in U.S. Pat. No. 4,542,623. An arrangement with two cooling-air pipes according to the preamble of claim 1 herein constitutes close prior art, at least within our firm. Cooling-air pipes of this kind extend at least partly outside the turbine casing and may become damaged, for example, when the aircraft gas turbine is in operation. The object of the invention, therefore, is to provide means which always ensure at least an adequate cooling of the turbine casing, particularly the wall space and the space for the turbine bearings.

To this end, the second cooling-air pipe has at least one air overflow opening located in the wall space of the turbine casing. Other advantageous features are disclosed in the subclaims.

According to the invention, cooling air enters the wall space in the turbine casing not only through the first cooling-air pipe, which opens into the wall space, but also through the second cooling-air pipe, which is mainly for cooling the turbine bearings mounting spaced for which purpose it extends through the wall space. According to the invention, air overflow openings are formed in the second cooling-air pipe in the region of the wall space so that cooling air can flow out into the wall space. If, for example, there is a break in the first cooling-air pipe which opens into the wall space, cooling air can still enter the wall space through the second cooling-air pipe and the openings therein. If, however, the second pipe is broken and the first pipe is intact, cooling air can flow from the wall space through the overflow openings into the second pipe so that the mounting space for the turbine bearings in the turbine casing can still be supplied with cooling air. The air overflow opening or openings, which can for example be in the form of holes in the tubular second pipe, act as 3-way valves.

To obtain a uniform distribution of cooling air, and also for the purpose of redundancy, two cooling-air pipes of the first-mentioned kind and two cooling-air pipes of the second-mentioned kind can be distributed around the periphery of the turbine casing.

The above-mentioned advantages and other advantages of the invention will be clear from the accompanying drawing of a preferred embodiment.

DETAILED DESCRIPTION OF THE DRAWINGS

Figure 1:
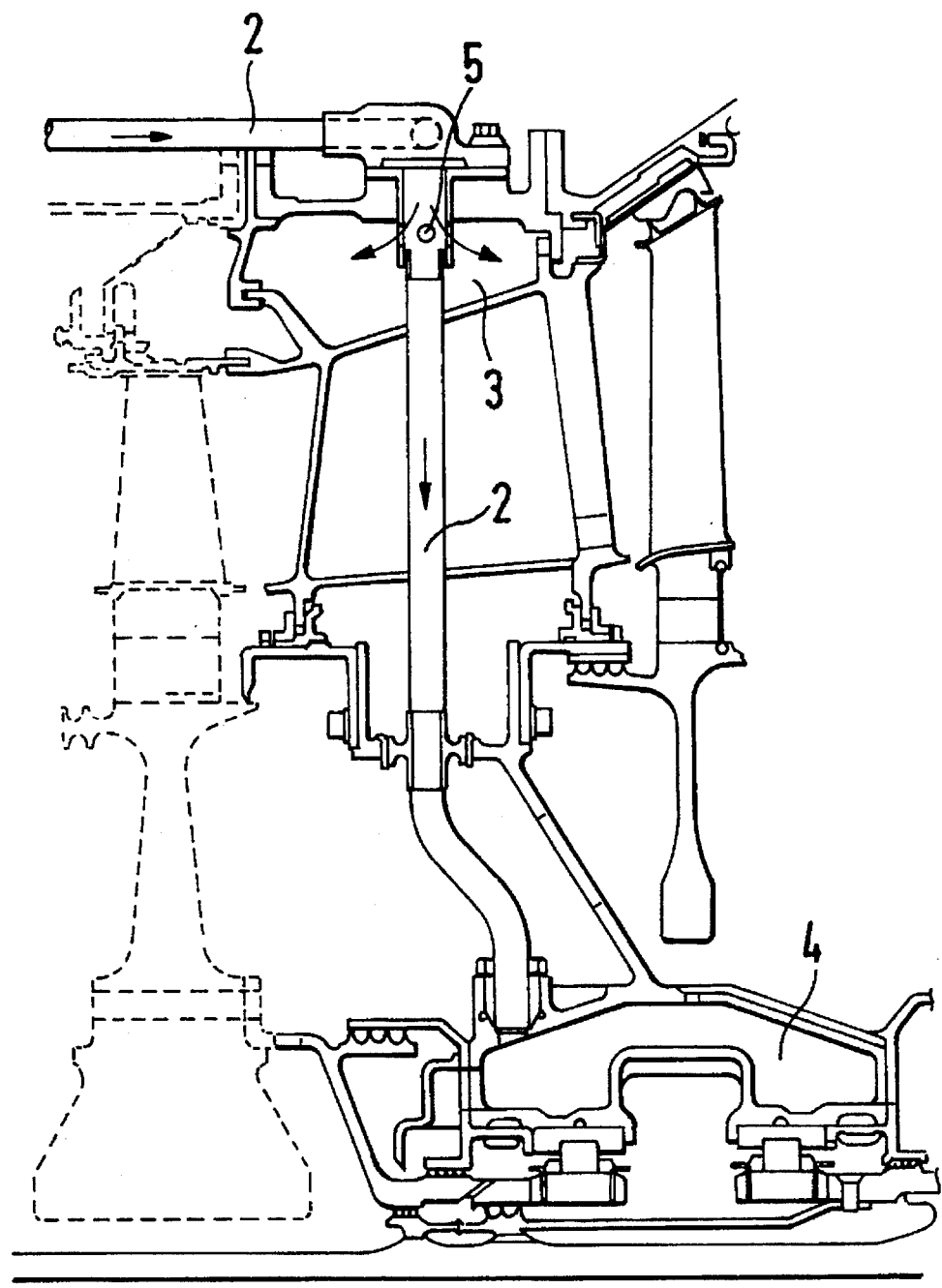
FIG. 1 is a partial longitudinal sectional view of a turbine casing according to the invention in the region of a second cooling-air pipe which is intact.

Cooling air is supplied through a first pipe 1 and a second pipe 2 to a wall space 3 and to a mounting space 4 for turbine bearings of an aircraft gas turbine casing. The two cooling-air pipes 1, 2 branch off from the fourth compressor stage of the associated aircraft gas turbine (not shown). The two pipes 1, 2 are of tubular form and extend partly outside the casing. The first pipe 1 opens into the wall space 3, whereas the second pipe 2 opens into the mounting space 4. The cooling system shown has to be extremely reliable, since the turbine casing itself, via its wall space 3, must be reliably cooled under all circumstances, and so must the turbine bearings which are disposed in the separate mounting space 4.

The cooling system is made reliable to the extent needed in that the second cooling-air pipe 2 has at least one air overflow opening—and preferably a number of air overflow openings 5—in the region of the wall space 3. In an extremely simple development, these air overflow openings 5 are in the form of holes in the tubular wall.

Figure 2:
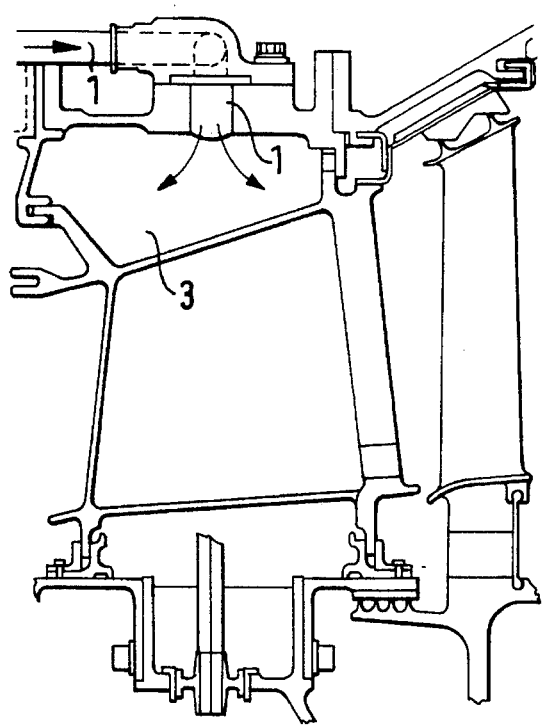
FIG. 2 is a partial longitudinal sectional view of the turbine casing in the region of an intact first cooling-air pipe.

FIGS. 1 and 2 show the conditions during normal operation when cooling air is supplied. Cooling air flows into the mounting space 4 through the second pipe 2, and in the process a small flow of cooling air also enters the wall space 3 through the air overflow openings 5. In particular, however, the wall space 3 is intensively cooled by the cooling-air flow supplied through the first pipe 1.

Figure 3:
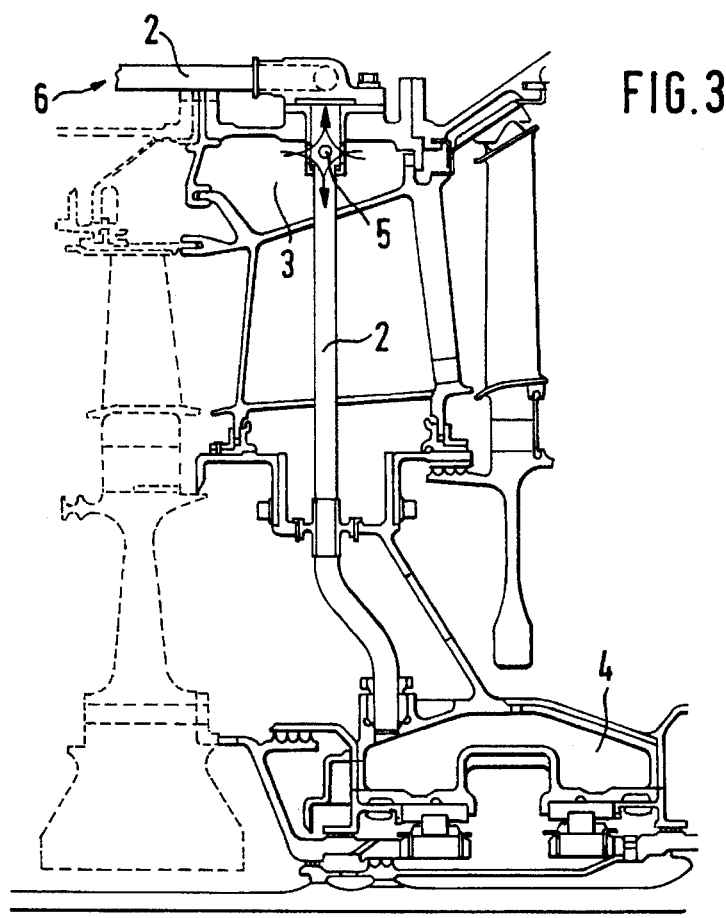
FIG. 3 is a sectional view corresponding to FIG. 1 but with a cooling-air pipe broken.

If, on the other hand, the second cooling-air pipe is broken outside the casing, as indicated by reference 6 in FIG. 3, cooling air continues to flow through the first pipe 1 into the wall space, but the supply of the mounting space 4 with cooling air directly through the second pipe 2 is no longer ensured. To remedy this situation, cooling air from the wall space 3 flows through the air overflow openings 5 into the second pipe 2 so that, even when the pipe 2 becomes broken outside the turbine casing, cooling air continues to reach the mounting space 4. This flow of cooling air through the overflow openings 5 is indicated by arrows.

Although not shown, this redundant system also works in cases when the first cooling-air pipe 1 becomes broken outside the turbine casing. In that case, cooling air is supplied to the wall space 3 through the second pipe 2 only and, as before, the required minimum cooling-air flow can reach the wall space 3 from the second cooling-air pipe 2 via the air overflow openings 5.

Of course, there can be more than one cooling-air pipe 1 or 2. In a preferred embodiment, for example, two first cooling-air pipes 1 and two second cooling-air pipes 2 are provided, the respective pipes being distributed opposite one another around the periphery of the turbine casing. However these and other details can differ from the embodiment shown without departing from the content of the claims.

What is claimed:

1. An arrangement for supplying cooling air to a turbine casing, comprising at least two cooling-air pipes or ducts branching off from a compressor stage, one pipe opening into a wall space of the turbine casing and the other pipe extending through the wall space and opening into a mounting space for turbine bearings, wherein the other cooling-air pipe has at least one air overflow opening located in the wall space.

2. An arrangement according to claim 1, wherein the other cooling-air pipe, which extends through the wall space, is a substantially continuous tube the wall of which is formed with a number of holes serving as the at least one air overflow opening in the region of the wall space.

3. An arrangement according to claim 1, wherein a total of four cooling-air pipes are distributed around the periphery of the turbine casing, two pipes arranged substantially opposite one another and opening into the wall space and the other two pipes, likewise substantially opposite one another, extending through the wall space and opening into the mounting space and being provided with a plurality of said air overflow openings in the region of the wall space.

4. An arrangement according to claim 3, wherein each of the other two pipes, which extend through the wall space, is a substantially continuous tube the wall of which is formed with a number of holes serving as the plurality of said air overflow openings in the region of the wall space.

5. An arrangement according to claim 1, wherein the turbine casing is an aircraft gas turbine casing.

* * * * *